US012633796B2

(12) United States Patent
Lee et al.

(10) Patent No.: US 12,633,796 B2
(45) Date of Patent: May 19, 2026

(54) ELECTRIC COMPRESSOR

(71) Applicant: Hanon Systems, Daejeon (KR)

(72) Inventors: Hyun Woo Lee, Daejeon (KR); Sung Taeg Oh, Daejeon (KR); Min Gyu Kim, Daejeon (KR); Seung Kil Kim, Daejeon (KR); Sang Woo Bae, Daejeon (KR); Hew Nam Ahn, Daejeon (KR); Young Seop Yoon, Daejeon (KR); Je Su Yun, Daejeon (KR)

(73) Assignee: HANON SYSTEMS (KR)

( * ) Notice: Subject to any disclaimer, the term of this patent is extended or adjusted under 35 U.S.C. 154(b) by 0 days.

(21) Appl. No.: 18/871,606

(22) PCT Filed: Jun. 9, 2023

(86) PCT No.: PCT/KR2023/007915
§ 371 (c)(1),
(2) Date: Dec. 4, 2024

(87) PCT Pub. No.: WO2024/128437
PCT Pub. Date: Jun. 20, 2024

(65) Prior Publication Data
US 2025/0357817 A1     Nov. 20, 2025

(30) Foreign Application Priority Data
Dec. 14, 2022     (KR) .......................... 1020220175109

(51) Int. Cl.
*H02K 5/10*          (2006.01)
*H02K 5/22*          (2006.01)
(Continued)

(52) U.S. Cl.
CPC ............... *H02K 5/10* (2013.01); *H02K 11/33* (2016.01); *H02K 5/22* (2013.01); *H02K 5/225* (2013.01);
(Continued)

(58) Field of Classification Search
CPC ............................................. B60H 2001/3292
See application file for complete search history.

(56) References Cited

U.S. PATENT DOCUMENTS

| 8,618,703 B2 * | 12/2013 | Kinoshita | ............... F04B 35/04 310/71 |
| 11,629,713 B1 * | 4/2023 | Haseley | .............. F04C 18/0215 418/55.6 |

(Continued)

FOREIGN PATENT DOCUMENTS

| JP | 2016070199 A | 5/2016 |
| JP | 2020169572 A | 10/2020 |

(Continued)

*Primary Examiner* — Binh Q Tran
(74) *Attorney, Agent, or Firm* — Shumaker, Loop & Kendrick, LLP; James D. Miller

(57) ABSTRACT
An electric compressor including a housing, a compression unit disposed within the housing, a motor unit housed within the housing, and an inverter unit coupled to one side of the housing to control the motor unit, wherein the inverter unit includes an inverter body coupled to one side of the housing, an inverter cover attached to a facing side of the inverter body, and a sealing member integrally formed on one side and the other side of the inverter body, wherein the electric compressor forms the sealing member simultaneously with the formation of the inverter body, eliminating the need for workers to install gaskets for sealing, thereby improving assembly between the housing and the inverter unit while maintaining sealing stability.

10 Claims, 9 Drawing Sheets

(51) Int. Cl.
*H02K 11/20* (2016.01)
*H02K 11/33* (2016.01)
*H02K 47/02* (2006.01)
*H02K 47/14* (2006.01)

(52) U.S. Cl.
CPC .............. *H02K 11/20* (2016.01); *H02K 47/02* (2013.01); *H02K 47/14* (2013.01); *H02K 2211/03* (2013.01)

(56) References Cited

U.S. PATENT DOCUMENTS

| | | | | |
|---|---|---|---|---|
| 2013/0049550 A1* | 2/2013 | Watanabe | .............. | F04B 39/121 |
| | | | | 310/67 R |
| 2013/0069494 A1* | 3/2013 | Hattori | .................. | F04C 23/008 |
| | | | | 310/68 D |
| 2020/0313495 A1* | 10/2020 | Yamakage | .......... | F04C 18/0215 |
| 2020/0355405 A1* | 11/2020 | Yim | ........................ | F01C 21/10 |
| 2021/0156380 A1* | 5/2021 | Kataoka | .................... | H02K 7/14 |
| 2021/0320566 A1* | 10/2021 | Yamamoto | ............... | H02K 5/06 |

FOREIGN PATENT DOCUMENTS

| | | |
|---|---|---|
| KR | 1020130025649 A | 3/2013 |
| KR | 1020200085166 A | 7/2020 |
| KR | 1020210156374 A | 12/2021 |

* cited by examiner rear
side front
side

ELECTRIC COMPRESSOR

CROSS REFERENCE TO RELATED PATENT APPLICATIONS

This is a U.S. national phase patent application of PCT/KR2023/007915 filed Jun. 9, 2023, which claims the benefit of and priority to Korean Patent Application No. 10-2022-0175109 filed on Dec. 14, 2022, the entire contents of each of which are incorporated herein by reference for all purposes.

TECHNICAL FIELD

The present invention relates to an electric compressor with a sealing member, and more particularly, to an electric compressor in which a sealing member is molded into the inverter body using a double injection method, thereby enhancing sealing performance and manufacturability and reducing the assembly process.

BACKGROUND ART

Generally, the cooling system in a vehicle consists of a compressor, a condenser, an expansion valve, and an evaporator, where the compressor compresses the refrigerant gas discharged from the evaporator into a high-temperature, high-pressure state that makes it easier to liquefy and then delivers it to the condenser. Additionally, the compressor pumps the refrigerant to ensure continuous cooling by recirculating it.

The condenser cools and liquefies the high-temperature, high-pressure refrigerant gas through heat exchange with the outside air, while the expansion valve lowers the temperature and pressure of the liquid refrigerant through adiabatic expansion, making it easier to evaporate in the evaporator.

The evaporator absorbs heat by exchanging heat between the liquid refrigerant and the outside air introduced into the interior, causing the refrigerant to evaporate and vaporize. The outside air, having lost heat to the refrigerant and thus cooled, is blown into the vehicle's interior by a blower.

In a vehicle air conditioning system, the compressor takes in the fully evaporated refrigerant from the evaporator, compresses it into a high-temperature, high-pressure state suitable for liquefaction, and delivers it to the condenser. Such compressors can use mechanisms that compress the refrigerant through either a reciprocating motion, called the reciprocating type, or a rotational motion, called the rotary type.

Rotary compressors can be further categorized into mechanical types, which use an engine as the power source, and electric types, which use a motor as the power source.

For example, a scroll compressor is a type of rotary compressor that uses two interleaving scrolls with involute engagement profiles, which perform compression through an orbital motion.

The scroll compressor operates through the relative rotation of an orbital scroll and a static scroll within the discharge chamber, with both scrolls having wraps shaped like identical involute curves, geometrically 180 degrees out of phase.

The scroll compressor forms crescent-shaped compression chambers through the interleaving of the orbital scroll and the static scroll, thus completing the compression cycle. The compression chambers are formed in a shape where the volume increases towards the outer edges and decreases towards the center, with a suction chamber formed on the outer side and a discharge port formed at the center.

In the scroll compressor, compression occurs as the suction gas sealed within a volume given at the outer circumference of the scrolls is gradually compressed towards the discharge port due to the relative rotation of the scrolls, and discharged through the discharge port.

The refrigerant discharged from the discharge chamber passes through an oil separator and undergoes centrifugal separation, ultimately being discharged through the discharge port. For example, the rotational speed of the motor, which drives the scroll compressor, is controlled by an inverter.

The inverter is equipped in the form of a printed circuit board (PCB), containing various circuit components including switching devices (IGBT: Insulated Gate Bipolar Transistor) and capacitors.

The inverter is controlled by a high-level control unit, i.e., the electronic control unit (ECU) of the vehicle. The inverter is equipped with communication circuitry to communicate with the vehicle's ECU. Among the communication protocols widely used in vehicle communication, there are controller area network (CAN) and local interconnect network (LIN).

As shown in FIG. 1, conventional inverter units include a gasket 40 installed for sealing between the motor housing 20 and the inverter 30. The gasket 40 is a separate component that requires workers to manually install it individually onto the motor housing 20 at the worksite. This has led to decreased worker productivity, prompting the need for a solution.

SUMMARY

The embodiments of the present invention aim to provide an electric compressor with improved worker productivity and assembly efficiency by integrally molding sealing members only at the locations where sealing is required on one side and the other side of the inverter body using an injection method.

An electric compressor according to an embodiment of the present invention includes a housing 10, a compression unit 3 disposed within the housing 10, a motor unit 2 housed within the housing 10 and configured to drive the compression unit 3, and an inverter unit 100 coupled to one side of the housing 10 to control the motor unit 2, wherein the inverter unit 100 includes an inverter body 110 coupled to one side of the housing 10, an inverter cover 120 attached to a facing side of the inverter body 110, and a sealing member 200 integrally formed on one side and the other side of the inverter body 110.

The inverter body 110 includes a connector coupling section 112 to which a plurality of connector are coupled.

The sealing member 200 is integrally molded with the inverter body 110 using a double injection method.

The inverter body 110 defines a direction facing a printed circuit board 130 including a plurality of switching elements mounted thereon as one side and the opposite direction as the other side, and the sealing member 200 is formed along the edge on one side of the inverter body 110, and on the other side, in an area excluding the connector coupling section 112.

The sealing member 200 includes a first sealing member 210 formed along the edge on one side of the inverter body 110, a second sealing member 220 formed along the edge on the rear side of the inverter body 110 excluding the connector coupling section 112, and a bridge 230 connecting the first sealing member 210 and the second sealing member 220.

The bridge 230 is formed in a circular or polygonal shape.

The bridge 230 includes a first bridge 232 connecting the first sealing member 210 and the second sealing member 220, a second bridge 234 protruding from an upper part of the first sealing member 210 toward the other side of the inverter body 110, and a third bridge 236 protruding from an upper rear part of the second sealing member 220 toward the first sealing member 210.

The first to third bridges extend at different lengths.

The inverter body 110 includes an insertion groove 114 formed along the edge to accommodate the sealing member 200 during double injection molding, and a slot 116 configured to provide space for forming the bridge 230.

The inverter body 110 includes mounting portions 140 spaced at predetermined intervals along one edge, protruding inwardly, and the sealing member 200 is positioned along the inside of the mounting portions 140.

The connector coupling section 112 is positioned on the rear side of the inverter body 110 and configured for a high-voltage connector and a low-voltage connector to be coupled from the outside to the inside thereof, and the second sealing member 220 is formed in the area excluding the rear of the connector coupling section 112.

In the preferred embodiments, sealing members are integrally formed on both sides of the structure-modified inverter body, eliminating the need for workers to install separate sealing members, thereby reducing assembly steps and improving productivity through enhanced workability.

The preferred embodiments improve the sealing performance of the inverter body of an electric compressor and enhance worker productivity by eliminating the need for workers to install gaskets.

DESCRIPTION OF AN EMBODIMENT

Figure 1:
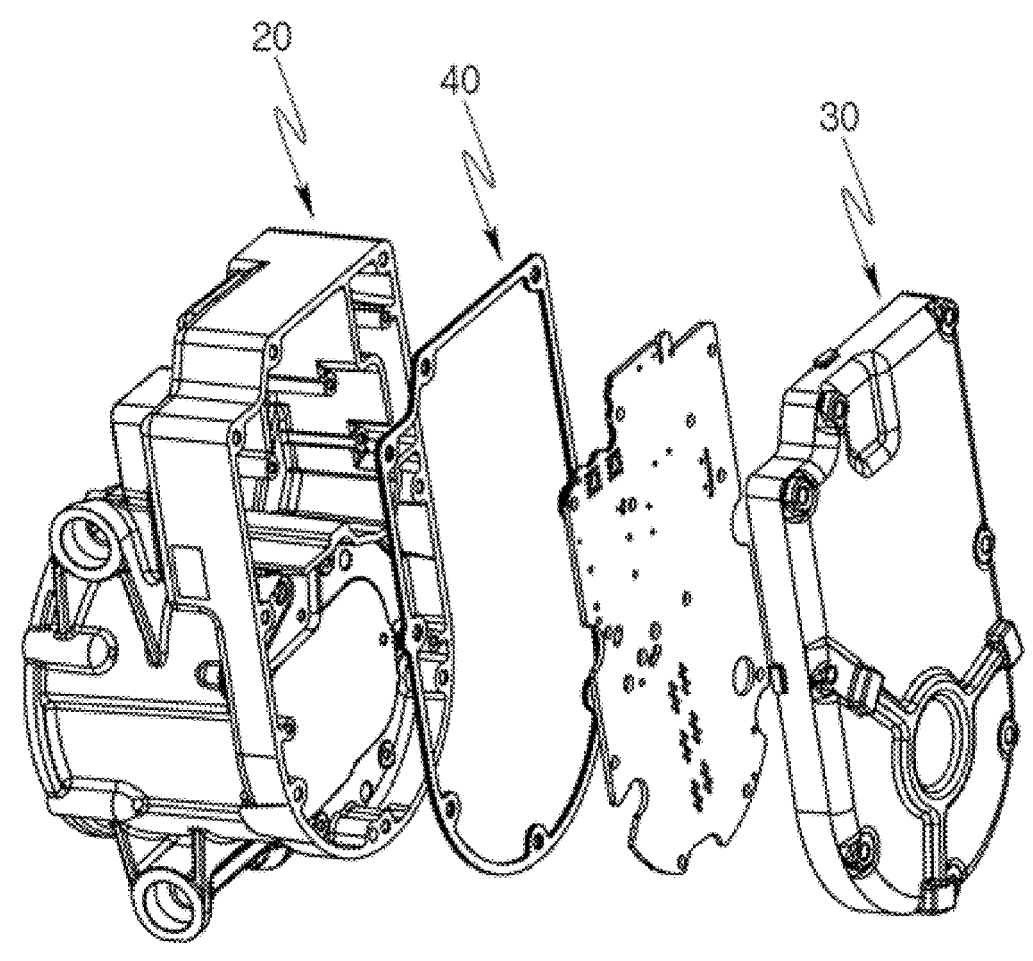
FIG. 1 is an exploded perspective view illustrating the assembly state of a conventional inverter unit and housing.

Advantages and features of the present disclosure and methods of accomplishing the same may be understood more readily by reference to the detailed description of embodiments that will be made hereinafter with reference to the accompanying drawings. The present disclosure may, however, be embodied in many different forms and should not be construed as being limited to the exemplary embodiments set forth herein; rather, these exemplary embodiments are provided so that this disclosure will be thorough and complete and will fully convey the concept of the invention to those skilled in the art, and the present disclosure will only be defined by the appended claims. Throughout the specification, the same reference numerals refer to the same components.

When a component is described as "connected to" or "coupled to" another component, it can refer to a direct connection or coupling with the other component, or to a case where another component is interposed therebetween. Meanwhile, when a component is referred to as "directly connected to" or "directly coupled to" another component, it indicates that there is no other component interposed therebetween. The expression "and/or" is taken to include each of the mentioned items and any combination of one or more.

The terminology used in this specification is for the purpose of describing embodiments, and is not intended to limit the present disclosure. In this specification, the singular form includes the plural form unless otherwise specified in the phrase. The "comprises" and/or "comprising" used in the specification do not preclude the presence or addition of one or more other components, steps, operations, and/or devices mentioned.

Although the terms "first", "second", and the like are used for describing various components, these components are not confined by these terms. These terms are merely used for distinguishing one component from the other components.

Figure 2:
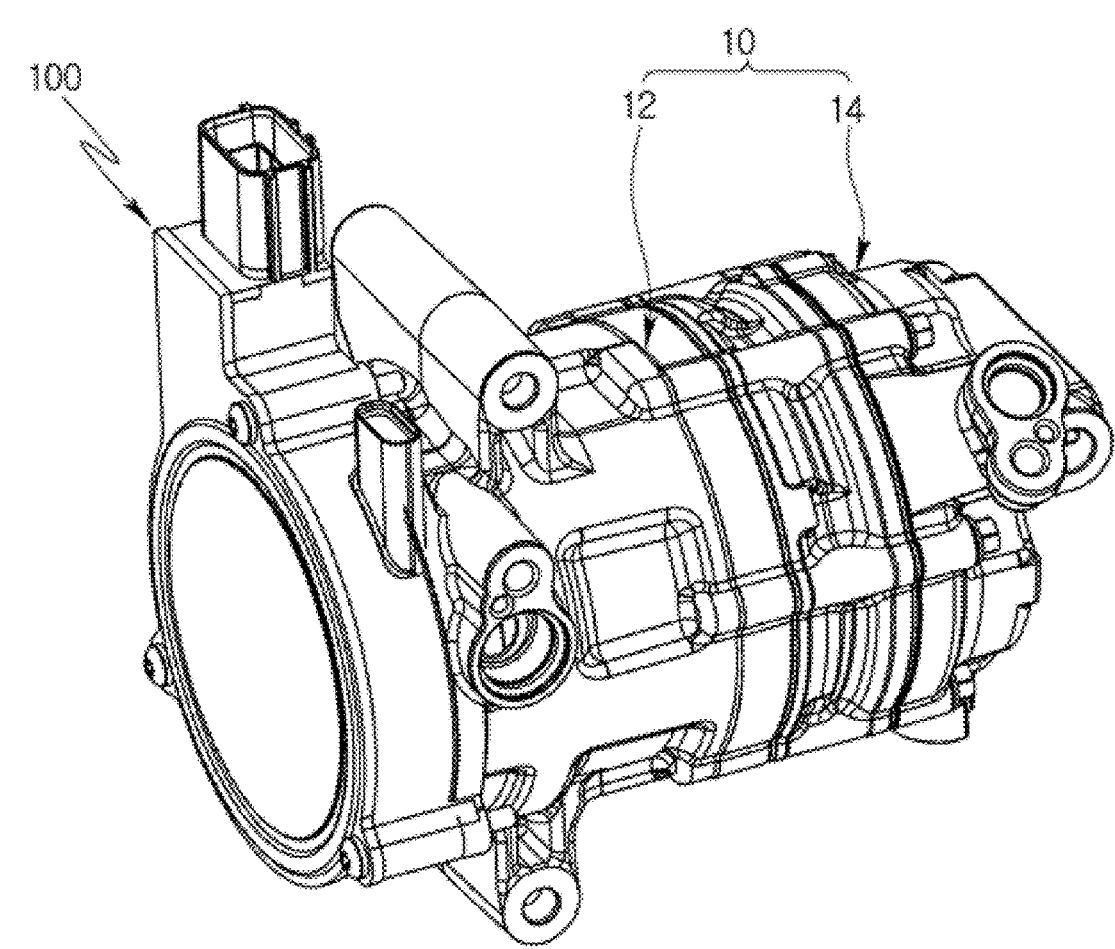
FIG. 2 is a perspective view illustrating an electric compressor according to a preferred embodiment.
Figure 3:
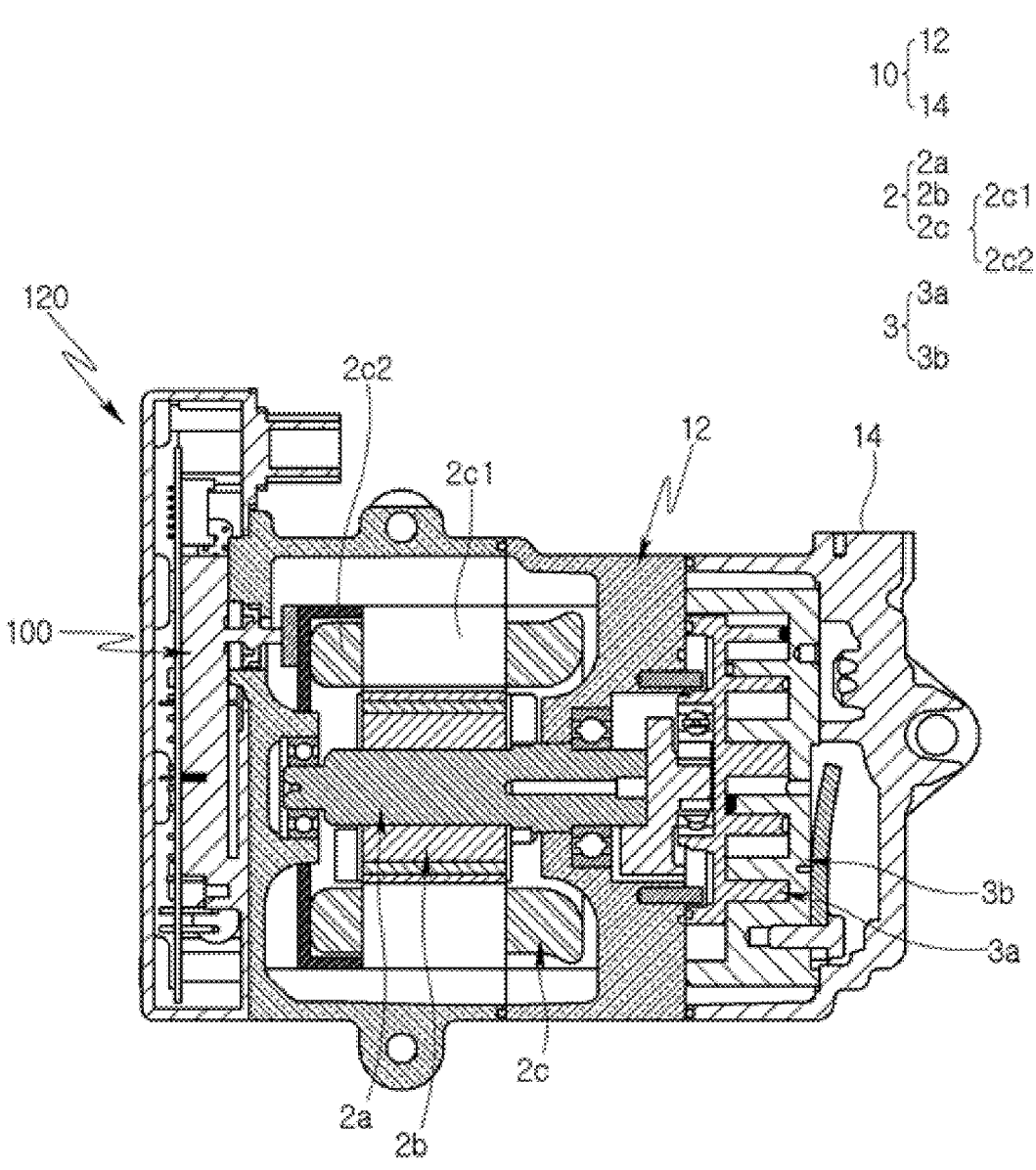
FIG. 3 is a longitudinal cross-sectional view of FIG. 1.
Figure 4:
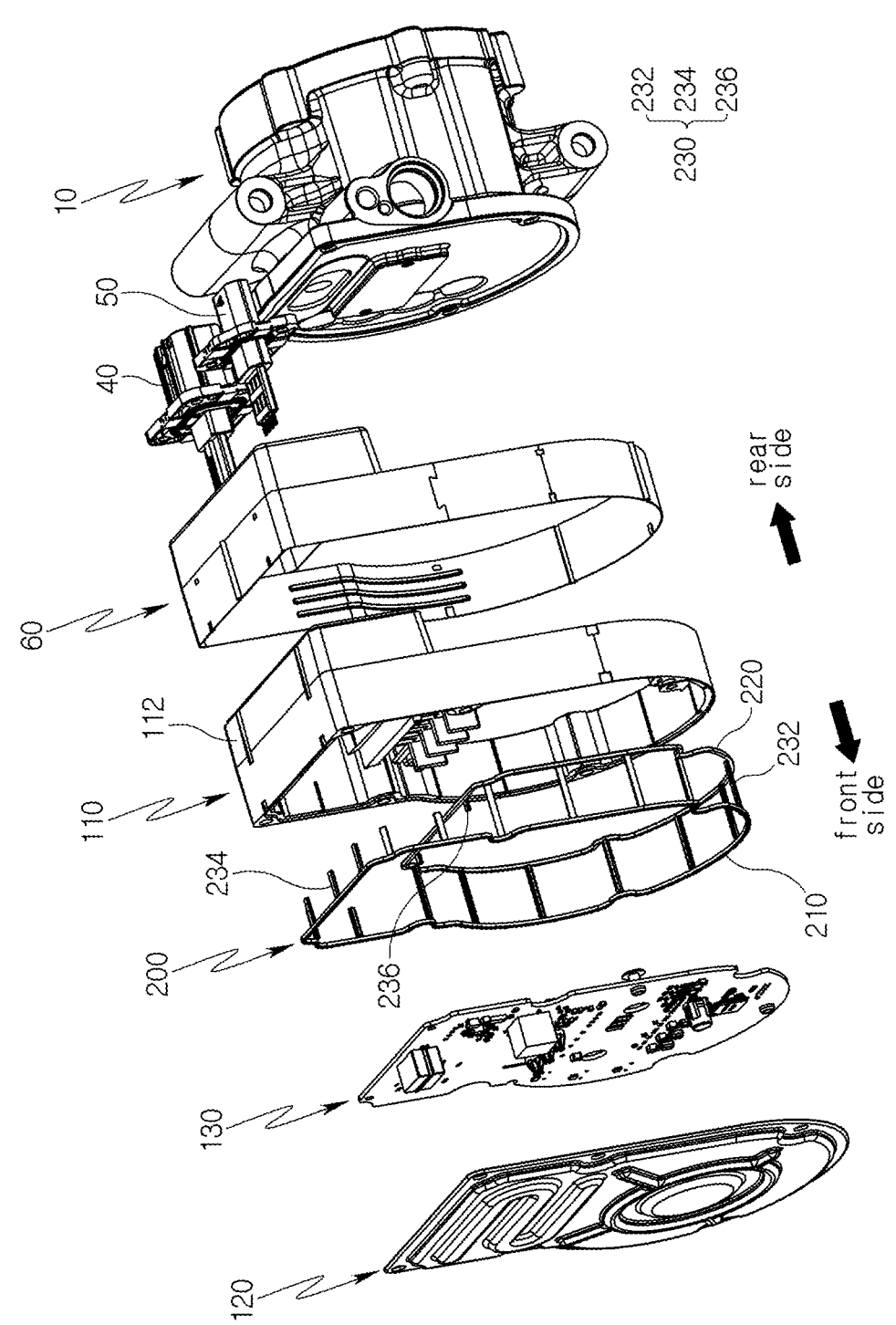
FIG. 4 is an exploded perspective view of an inverter unit according to a preferred embodiment.
Figure 5:
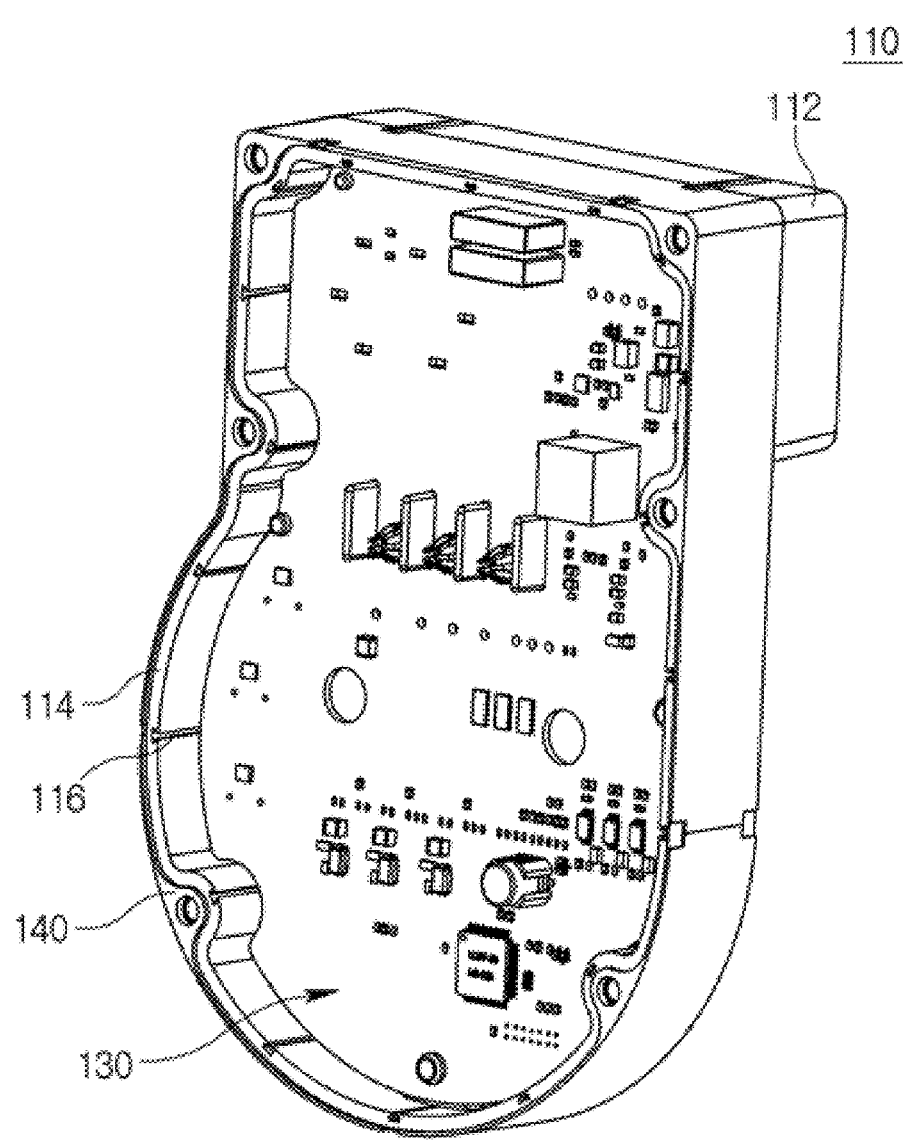
FIG. 5 is a perspective view illustrating an inverter body with a printed circuit board mounted thereon according to a preferred embodiment.
Figure 6:
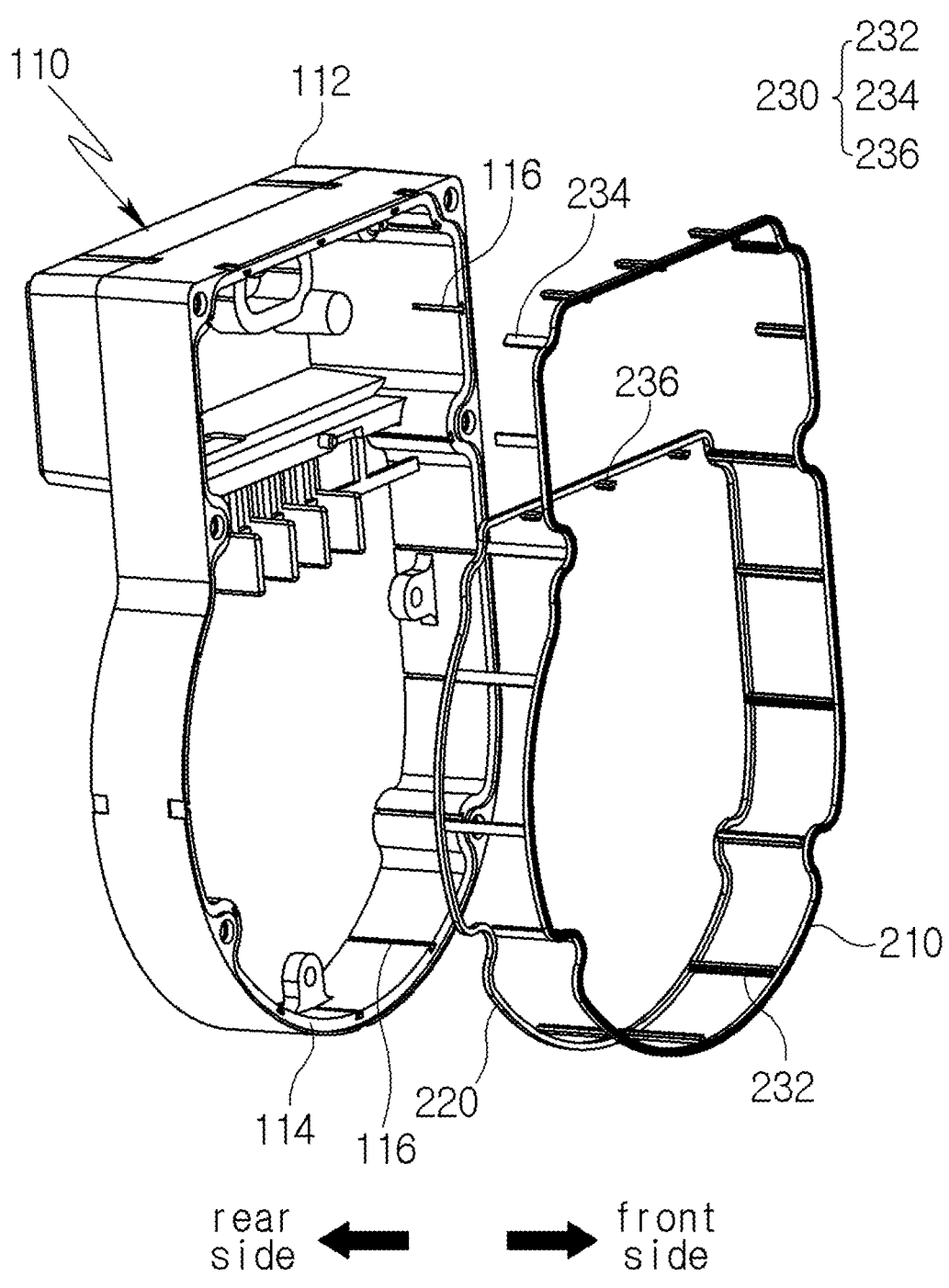
FIG. 6 is an exploded perspective view illustrating an inverter body and sealing member assembly according to a preferred embodiment.

A description is made of the electric compressor according to a preferred embodiment with reference to accompanying drawings. FIG. 2 is a perspective view illustrating an electric compressor according to a preferred embodiment, FIG. 3 is a longitudinal cross-sectional view of FIG. 1, FIG. 4 is an exploded perspective view of an inverter unit according to a preferred embodiment, FIG. 5 is a perspective view illustrating an inverter body with a printed circuit board mounted thereon according to a preferred embodiment, and FIG. 6 is an exploded perspective view illustrating an inverter body and sealing member assembly according to a preferred embodiment.

In this embodiment, the inverter body 110 and the sealing member 200 are integrally molded simultaneously using an injection method, eliminating the need for additional sealing work when assembling the inverter body 110 onto the housing 10, thereby enhancing worker productivity.

With reference to FIGS. 2 to 6, the electric compressor according to this embodiment includes a housing 10, a compression unit 3 provided within the housing 10, a motor unit 2 housed within the housing 10 to drive the compression unit 3, and an inverter unit 100 coupled to one side of the housing 10 to control the motor unit 2.

The housing 10 forms the overall exterior of the electric compressor and is composed of a front housing 12 and a rear housing 14 in this embodiment.

The motor unit 2 is housed within the front housing 12 and provides power for compressing the refrigerant in the compression unit 3. The motor unit 2 includes a rotor 2b coupled to a rotating shaft 2a rotatably installed at the center of the front housing 12, and a stator 2c fixed to the front housing 12 and arranged radially outward from the rotor 2b. The stator 2c includes a stator core 2c1 and a stator coil 2c2 wound around the stator core 2c1.

The compression unit 3 is housed within the rear housing 14 and includes an orbital scroll 3a coupled to the rotating shaft 2a via an eccentric bushing and a static scroll 3b fixed between the front housing 12 and rear housing 14 to form compression chambers where refrigerant compression occurs with the orbital scroll 3a.

As a result of the compression unit 3 being connected to the motor unit 2 via the rotating shaft 2a, the rotational power generated by the motor unit 2 may be transmitted to the orbital scroll 3a of the compression unit through the rotating shaft 2a.

The inverter unit 100 is located on the exterior of the housing 10, on the opposite side from the compression unit 3, relative to the motor unit 2. The inverter unit 100 is electrically connected to the motor unit 2, supplying power and control signals received from the outside to the motor unit 2 and controlling the operation of the motor unit 2.

In more detail, the stator 2c forms an electromagnetic field powered by the inverter unit 100, and as the rotor 2b rotates due to the electromagnetic field generated by the stator 2c, rotational power is generated to drive the compression unit 3.

The inverter unit 100 includes a printed circuit board (P) equipped with switching devices and an inverter cover 120 attached to the housing 10 to enclose the printed circuit board 130.

The inverter unit 100 is attached to one side of the front housing 12, with the inverter body 110 and the inverter cover 120 are sequentially assembled relative to the front housing 12.

The inverter unit 100 is electrically connected to the motor unit, supplying power and control signals received from the outside to power and control the motor unit.

In more detail, the stator forms an electromagnetic field powered by the inverter unit 100, and as the rotor rotates due to the electromagnetic field generated by the stator, rotational power is generated to drive the compression unit.

The motor unit and the inverter unit 100 may be electrically connected by a terminal unit. In this embodiment, since a 3-phase motor is used, three connection pins and three terminals (not shown) connected to each of the three phases may be provided on the printed circuit board 130 to supply 3-phase power from the inverter unit 100 to the motor unit.

Each of the three connection pins is connected to the 3-phase coils of the stator, extends through the front housing 12, and protrudes to the inside of the inverter unit 100. Each connection pin protruding inside the inverter unit 100 penetrates the printed circuit board 130 of the inverter unit 100 and is electrically connected to the printed circuit board 200 through respective terminals.

The inverter unit 100 according to this embodiment may include a CM choke (not shown), a high-voltage connector 40, a low-voltage connector 50, and an electromagnetic shielding member 60, in addition to the inverter body 110, the inverter cover 120, and the printed circuit board 130.

The inverter body 110 is positioned on one side of the front housing 12, and the circuit board 130 to which the switching elements are connected is mounted on the inside of the inverter body 110.

In this embodiment, the inverter body 110 is formed from plastic material to reduce costs and weight, thereby achieving weight reduction.

The inverter unit 100 further includes the inverter cover 120 that is attached facing the inverter body 110 and a sealing member 200 integrally formed on one side and the other side of the inverter body 110.

The inverter body 120 has a connector coupling section 112 positioned at the rear, and the high-voltage connector 40 and low-voltage connector 50 are joined respectively from the outside to the inside of the connector coupling section 112.

The high-voltage connector 40 is provided, for example, to supply vehicle-side high voltage to the inverter, while the low-voltage connector 50 is provided to supply low voltage to or transmit signals for electrical components operating at low voltage among the vehicle components.

In this embodiment, the connector coupling section 112 is integrally formed on the inverter body 120, and assembly is achieved through modularization with the printed circuit board 130, allowing simultaneous secure mounting of the printed circuit board 130 and effective sealing using the sealing member 200.

While molded from plastic in this embodiment for weight reduction, the inverter body 110 may also be made from other lightweight materials, without being limited to any specific material.

In this embodiment, the inverter body 110 defines a direction facing the printed circuit board 130 with a plurality of switching elements mounted thereon as one side and the opposite direction as the other side. The sealing member 200 is formed along the edge on one side of the inverter body 110, and on the other side, in areas excluding the connector coupling section 112.

The printed circuit board 130 is mounted on the inside of one side of the inverter body 110, and the sealing member 200 is formed along the edge on this side to ensure stable sealing, preventing the ingress of moisture and foreign substances.

The sealing member 200 is molded with the inverter body 110 using a double injection method and may be replaced with other materials whose sealing stability has been verified, such as rubber. In this embodiment, the molding of the inverter body 110 is performed first, followed by the molding of the sealing member 200.

While rubber is used for the sealing member 200, other materials that provide stable sealing may be used as replacements.

The sealing member 200 according to this embodiment includes a first sealing member 210 formed along the edge on one side of the inverter body 110, a second sealing member 220 formed along the edge on the rear side of the inverter body 110 excluding the connector coupling section 112, and a bridge 230 connecting the first sealing member 210 and the second sealing member 220.

The first and second sealing members 210 and 220 may be formed in shapes other than those shown in the drawings and are not limited to the depicted shapes.

The bridge 230 is molded together with the first and second sealing members 210 and 220 and serve to connect the first and second sealing members 210 and 220 to each other, thereby enhancing both the stable moldability and structural stability of the first and second sealing members 210 and 220.

The bridge 230 connects the first and second sealing members 210 and 220 to minimize the phenomenon of weakened bonding strength one side or the other side of the inverter body 110, thereby maintaining a stable bonding relationship.

To achieve this, the bridge 230 is formed with a relatively thicker thickness than the first and second sealing members 210 and 220, maintaining the bonding strength.

The bridge 230 may be formed in either a circular or polygonal shape and is not limited to any specific shape, allowing for various modifications.

The bridge 230 according to this embodiment includes a first bridge 232 connecting the first sealing member 210 and the second sealing member 220, a second bridge 234 protruding from the upper side of the first sealing member 210 toward the other side of the inverter body 110, and a third bridge 236 protruding from the upper rear side of the second sealing member 220 toward the first sealing member 210.

The first bridge 232 is formed at the interval shown in the drawing, maintaining consistent fastening strength at the edges of the inverter body 110, thereby ensuring stable sealing performance and fastening stability simultaneously.

The second bridge 234 maintains the first sealing member 210 securely attached to one side of the inverter body 110, while also enhancing the fastening strength and sealing performance on the upper side of the inverter body 110.

The third bridge 236 protrudes from the upper rear side of the second sealing member 220 toward the first sealing member 210, providing stable fastening and sealing performance for the connector coupling section 112 located on the rear side of the inverter body 110.

Therefore, the first, second, and third bridges 232, 234, 236 collectively maintain stable sealing performance in the inverter body 110.

The first bridge 232, second bridge 234, and third bridge 236 extend at different lengths, and are configured as shown in the drawing to simultaneously ensure sealing performance on one side and the other side of the inverter body 110, with particular consideration for the sealing performance at the rear where the connector coupling section 112 is located.

Figure 7:
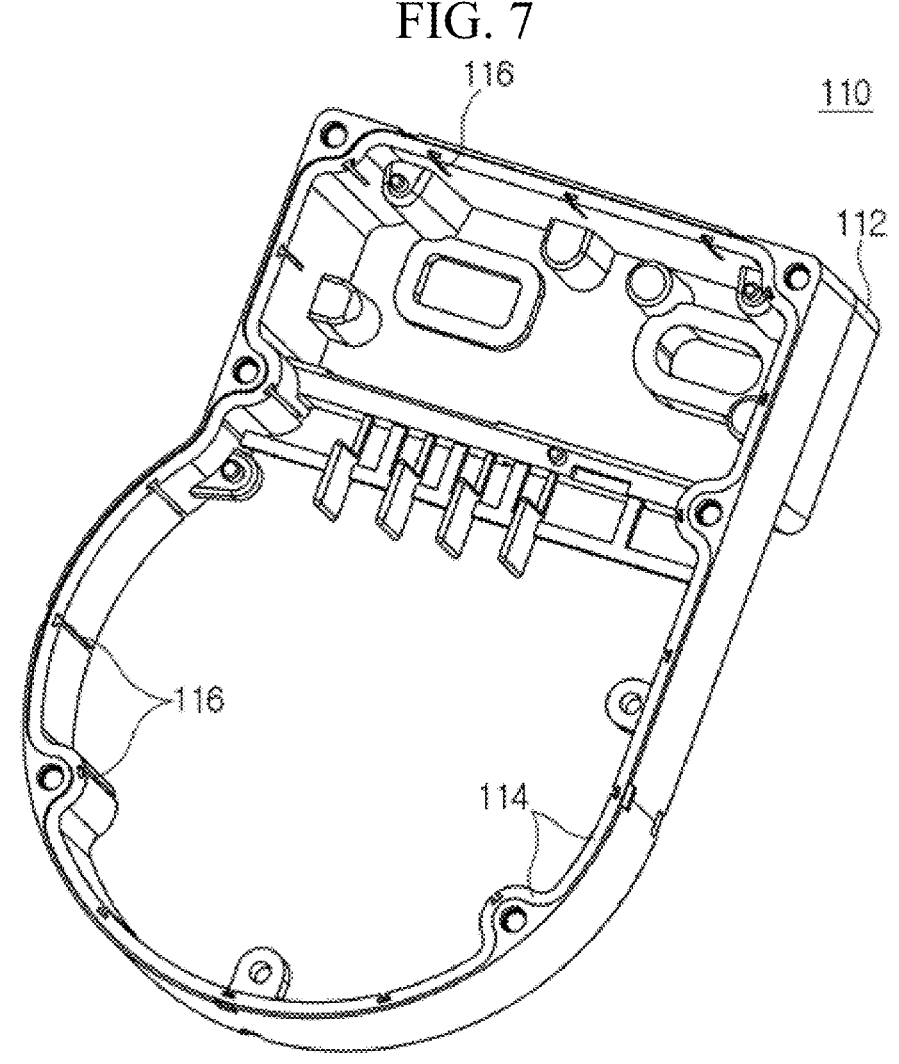
FIG. 7 is a front perspective view illustrating an inverter body according to a preferred embodiment.

With reference to FIGS. 6 and 7, the inverter body 110 includes an insertion groove 114 formed along the edge for securing the sealing member 200 during double injection molding, and slots 116 providing space for forming the bridge 230.

The insertion groove 114 provides a space for resin injection for molding the sealing member 200 while being formed to a predetermined depth, thereby serving as a positional guide to ensure precise molding of the sealing member 200 in correct position. In this case, the first sealing member 210 is constantly formed with stable resin injection and molding on one side of the inverter body 110, enhancing accuracy.

The slot 116 communicates with the insertion groove 114, defining the area for resin injection, ensuring that the sealing member 200 is molded in place on the inverter body 110 without shifting position. In this case, the first sealing member 210 may be formed with stable resin injection and molding on one side and the other side of the inverter body 110.

The slot 116 serves as a conduit for resin injection to mold the sealing member 200, extending at both ends towards one side and the other side of the inverter body 110, thereby facilitating stable resin injection and movement.

Figure 8:
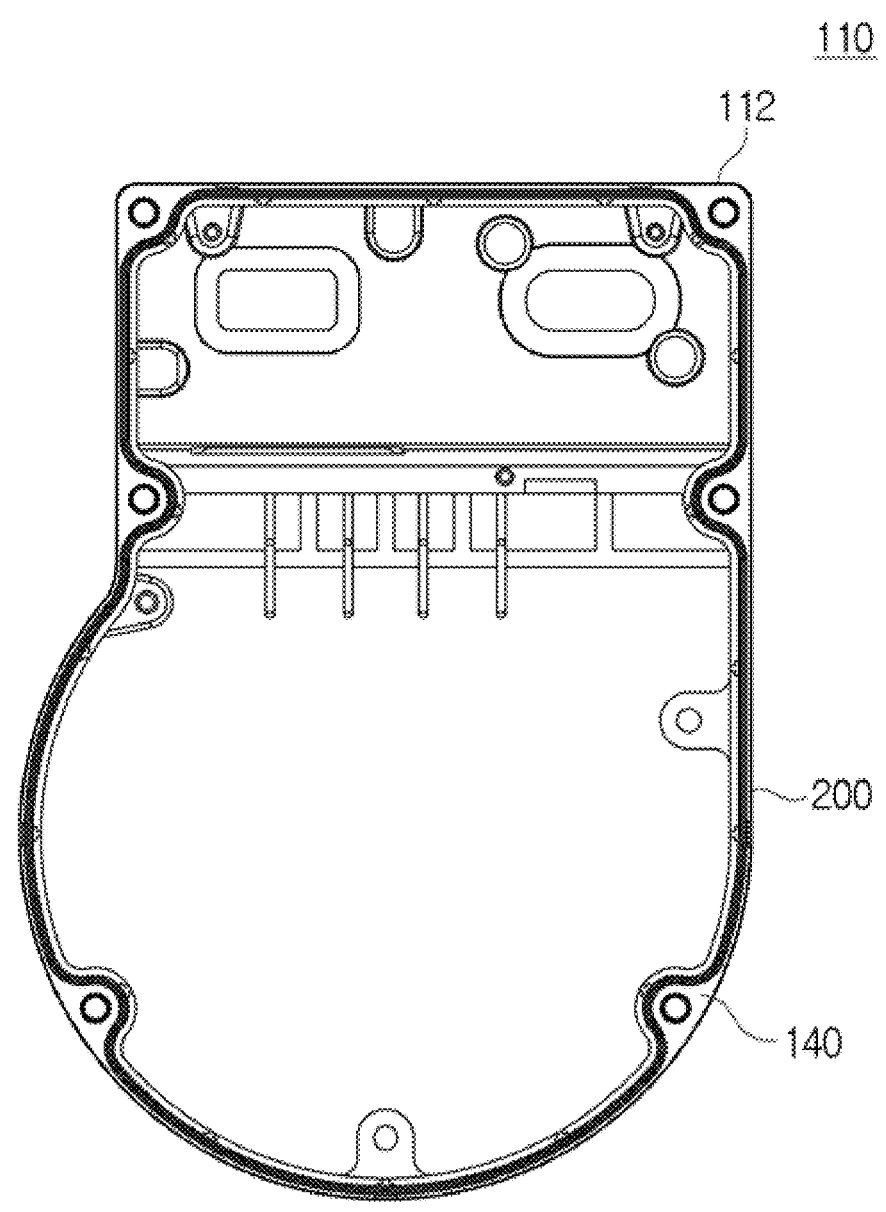
FIG. 8 is a front view illustrating an inverter body according to a preferred embodiment.
Figure 9:
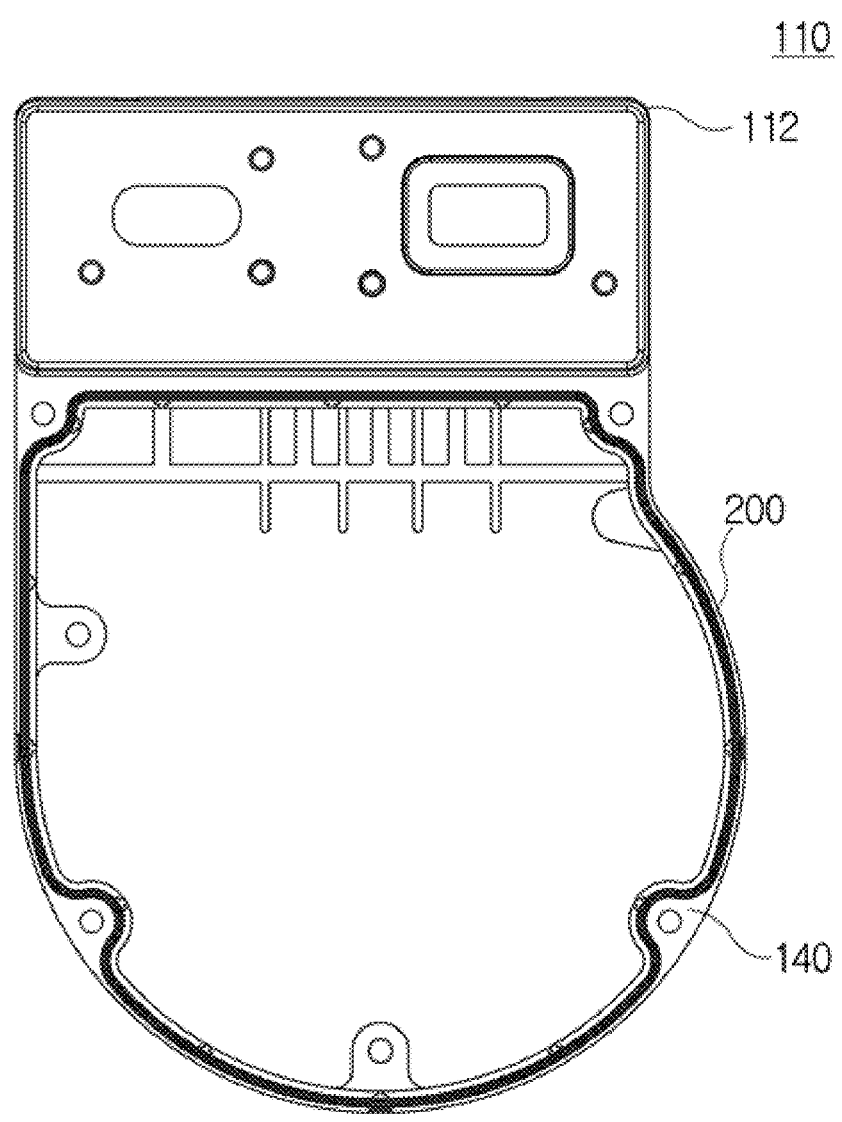
FIG. 9 is a rear view of an inverter body according to a preferred embodiment.

As shown in FIGS. 8 and 9, the inverter body 110 is equipped with mounting portions 140 spaced at predetermined intervals along one edge, protruding inwardly, and the sealing member 200 is positioned along the inside of the mounting portions 140, allowing stable prevention of moisture or foreign matter ingress into the printed circuit board 130 located inside the inverter body 110.

The sealing member 200, when extended along the inner side of the mounting portions 140 of the inverter body 110 rather than along the edge, forms a streamlined extension segment to prevent deformation during injection and molding, reducing stress concentration at the location of the mounting portions 140 for stable molding.

Particularly, the mounting portions 140 serve as the part that is fixed to the housing 10 through a fixing bolt, causing compressive loads along the axis of the fixing bolts when assembled. Considering these compressive loads being directly transferred to the sealing member 200, when the sealing member is formed in a streamlined shape along the inner side of the mounting portions 140 rather than along the outer side, the outer side is sealed by the surface pressure of the fixing bolt, and the inner side is sealed by the sealing member 200, resulting in a more stable coupling state.

As described above, the sealing member 200 being integrally formed on the inverter body 110 eliminates the need for workers to install gaskets for sealing. Therefore, the worker's workability and work efficiency are improved. Furthermore, when the inverter body 110 is integrated into an electric compressor along with an inverter cover 120 and a housing 10, stable operation and sealing of the electric compressor can be achieved in various environments.

Although the description has been made with example embodiments of the present invention, those skilled in the art will appreciate that various modifications and changes, such as addition, alteration, and deletion of components, can be made to the present invention without departing from the spirit and scope of the invention as set forth in the appended claims, and such modifications and changes are also included within the scope of the invention.

The preferred embodiments are advantageous in terms of achieving stable sealing of the inverter body of an electric compressor and improving worker efficiency.

The invention claimed is:

1. An electric compressor comprising:
a housing;
a compression unit disposed within the housing;
a motor unit housed within the housing and configured to drive the compression unit; and
an inverter unit coupled to one side of the housing to control the motor unit,
wherein the inverter unit further comprises:
an inverter body coupled to one side of the housing;
an inverter cover attached to a facing side of the inverter body;
a sealing member integrally formed on a first side and a second side of the inverter body,
wherein the sealing member further comprises:
a first sealing member formed along an edge of the first side of the inverter body;
a second sealing member formed on a rear edge of the inverter body;
a bridge connecting the first sealing member and the second sealing member,
wherein the bridge further comprises:
a first bridge connecting the first sealing member and the second sealing member;
a second bridge protruding from an upper part of the first sealing member toward the second side of the inverter body; and
a third bridge protruding from an upper rear part toward the first sealing member.

2. The electric compressor of claim 1, wherein the inverter body further comprises a connector coupling section to which a plurality of connectors is coupled.

3. The electric compressor of claim 1, wherein the sealing member is integrally molded with the inverter body using a double injection method.

4. The electric compressor of claim 3, wherein the inverter body defines a direction facing a printed circuit board further comprising a plurality of switching elements mounted thereon as a first side and an opposite direction as a second side, and the sealing member is formed along the edge on the first side of the inverter body, and on the second side, in an area excluding a connector coupling section.

5. The electric compressor of claim 2, wherein the second sealing member is formed along an edge of the inverter body excluding the connector coupling section.

6. The electric compressor of claim 1, wherein the bridge is formed in a circular or polygonal shape.

7. The electric compressor of claim 1, wherein the first bridge, the second bridge, and the third bridge extend at different lengths.

8. The electric compressor of claim 1, wherein the inverter body further comprises:

an insertion groove formed along the edge of the first side of the inverter body to accommodate the sealing member during double injection molding; and a slot configured to provide space for forming the bridge.

9. The electric compressor of claim 1, wherein the inverter body further comprises mounting portions spaced at predetermined intervals along the edge of the first side of the inverter body, protruding inwardly, and the sealing member is positioned along an inside of the mounting portions.

10. The electric compressor of claim 2, wherein the connector coupling section is positioned on the second side of the inverter body and configured for a high-voltage connector and a low-voltage connector to be coupled from an outside to an inside thereof, and the second sealing member is formed in the area excluding a rear of the connector coupling section.

\* \* \* \* \*